(12) United States Patent
Aburatani et al.

(10) Patent No.: US 8,092,629 B2
(45) Date of Patent: Jan. 10, 2012

(54) METHOD FOR FORMING POROUS PTFE LAYER

(75) Inventors: Yasushi Aburatani, Nara (JP); Toshikiyo Komazawa, Nara (JP); Tatsuo Takamure, Nara (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 0 days.

(21) Appl. No.: 13/031,274

(22) Filed: Feb. 21, 2011

(65) Prior Publication Data

US 2011/0139343 A1 Jun. 16, 2011

Related U.S. Application Data

(62) Division of application No. 12/764,131, filed on Apr. 21, 2010, which is a division of application No. 11/932,446, filed on Oct. 31, 2007, now Pat. No. 7,867,351.

(30) Foreign Application Priority Data

Oct. 31, 2006 (JP) ................................ 2006-295753

(51) Int. Cl.
*B32B 3/10* (2006.01)
(52) U.S. Cl. ........................................ 156/184; 428/438
(58) Field of Classification Search .................. 156/184; 428/138
See application file for complete search history.

(56) References Cited

U.S. PATENT DOCUMENTS

| | | |
|---|---|---|
| 3,486,961 A | 12/1969 | Adams |
| 4,375,441 A | 3/1983 | Adams et al. |
| 5,552,100 A | 9/1996 | Shannon et al. |
| 5,614,284 A * | 3/1997 | Kranzler et al. .............. 428/138 |
| 6,143,675 A | 11/2000 | McCollam et al. |
| 2002/0111667 A1* | 8/2002 | Girton et al. ................. 623/1.13 |
| 2004/0126646 A1 | 7/2004 | Suda et al. |
| 2005/0188907 A1 | 9/2005 | D'Henin |
| 2007/0260268 A1* | 11/2007 | Bartee et al. .................. 606/151 |

FOREIGN PATENT DOCUMENTS

| | | |
|---|---|---|
| JP | 06106037 A | 4/1994 |
| JP | 9123302 A | 5/1997 |
| JP | 11506987 A | 6/1999 |
| JP | 11511707 A | 10/1999 |
| JP | 2004063200 A | 2/2004 |
| JP | 2005235519 A | 9/2005 |
| JP | 2005329405 A | 12/2005 |
| JP | 2006075757 A | 3/2006 |

* cited by examiner

*Primary Examiner* — Katarzyna I. Wyrozebski
*Assistant Examiner* — Jaeyun Lee
(74) *Attorney, Agent, or Firm* — The Webb Law Firm

(57) ABSTRACT

A method for forming a porous PTFE layer includes steps of: combining one or at least two unburned porous PTFE films and a support body that can withstand a heating condition in the following process (a rod or plate shaped support body made of mesh or the like is preferable) by using a predetermined means in such a manner that a slip can be prevented in a heating treatment in the following process; and heating the matter resulted from the above process at a temperature of at least 150° C. and less than the melting point of the PTFE film for the range of 5-120 minutes (preferably at a temperature in the range of the melting point of a thermoplastic resin fiber to 320° C. for the range of 10-60 minutes in the case in which the thermoplastic resin fiber or the like is used in the process).

3 Claims, 3 Drawing Sheets

METHOD FOR FORMING POROUS PTFE LAYER

CROSS REFERENCE TO RELATED APPLICATIONS

This application is a division of U.S. patent application Ser. No. 12/764,131 filed Apr. 21, 2010, which is a division of U.S. patent application Ser. No. 11/932,446 filed Oct. 31, 2007, now U.S. Pat. No. 7,867,351 issued Jan. 11, 2011, and claims priority under 35 U.S.C. §119 to Japanese Patent Application No. JP 2006-295753, filed Oct. 31, 2006, which applications are expressly incorporated herein by reference in their entirety.

BACKGROUND OF THE INVENTION

1. Field of the Invention

The present invention relates to a method for forming a porous PTFE layer made of a porous polytetrafluoro ethylene (PTFE) film, a porous PTFE layer being obtained by the forming method, and a molded product including the porous PTFE layer.

2. Description of the Related Art

A porous PTFE film has an excellent mechanical strength property and is suitable for applications such as a membrane filter and an insulating tape to be used for an electric wire and a cable. Moreover, it is proposed that the porous PTFE film is used as a gas transmission film of a fuel battery having a type such as a solid polymer electrolyte or a gas diffusion electrode (see Japanese Patent Application Laid-Open Publication No. 2004-063200 and Japanese Patent Application Laid-Open Publication No. 2005-235519, etc.).

In general, such a porous PTFE film is manufactured by stretching a PTFE film obtained in a calendering process (extrusion processed substance) to improve a porosity and a strength of the film and by orientating a PTFE fibril in a stretching direction. The porosity of a film to be obtained depends on a size of a gap existing between fibrils.

A micropore to be formed in a film by the above stretching is closed in the case in which an elasticity (extensibility) of the film is recovered after the stretching, thereby preventing the porosity of the film from being held. Consequently, after the stretching process, the PTFE film is heated to a temperature that is higher than a crystalline melting point (327° C.) of the PTFE and that is lower than a thermal decomposition temperature (370° C.) of the PTFE, and a PTFE polymer is sintered to lower an elasticity of the film and to maintain a size of a micropore and a porosity.

However, in the case in which the film is contracted and retracted during the above sintering, a wrinkle is easily formed on the film. To suppress this problem, a special means is required. For instance, as described in Japanese Unexamined Patent Application Publication No. 11-511707, in the case in which a uniaxially stretched film is prepared, the uniaxially stretched film is heated and sintered while dimensions are fixed by applying a tension in a stretching direction.

On the other hand, it is said to be a problem for research and development to satisfactorily form a laminated structure capable of displaying desired functionality for a molded product such as a tube made of a PTFE film.

For instance, Japanese Patent Application Laid-Open Publication No. 09-123302 discloses a composite tube having a structure in which a burned or unburned porous PTFE layer (outer layer) is laminated and bonded on a peripheral surface of a thermoplastic resin tube (inner layer). As a method to be used for an interlayer bonding, for instance, the inner layer and the outer layer are heat-fused in an integrating manner by a heating treatment (preferably to a temperature equivalent to or higher than a melting point of the PTFE), or an adhesive layer is disposed between the inner layer and the outer layer (paragraph [0013] of the document).

A method for manufacturing a porous multilayer hollow fiber disclosed in Japanese Patent Application Laid-Open Publication No. 2005-329405 is characterized by forming a convex and a concave on a peripheral surface of a porous stretched PTFE tube (support layer), wrapping the tube in a porous stretched resin sheet (filtering layer), applying a load simultaneously with or after the wrapping in order to bond the porous stretched PTFE tube and the porous stretched resin sheet, and sintering the porous stretched PTFE tube and the porous stretched resin sheet in an integrating manner (Claim 1). Patent document 5 describes that the formation of a convex and a concave can prevent the tube and the sheet from being dislocated, and the load can prevent the sheet from floating, thereby improving an adhesive property of the tube and the sheet (paragraph [0039] of the document). Moreover, the porous stretched PTFE tube and the porous stretched resin sheet are sintered at a temperature equivalent to or higher than a melting point of the tube and the sheet (for instance, 350° C. in Embodiment 1), thereby firmly fusing the tube and the sheet in an integrating manner (paragraph [0040] of the document).

Japanese Patent Application Laid-Open Publication No 11-506987 discloses a method for manufacturing a porous composite material in which a burned porous PTFE layer that is not stretched and not expanded is formed on a stretched expanded PTFE film by spray coating a fluid dispersion of unburned PTFE particles to the stretched expanded PTFE film and by heating the film at a high temperature. In detail, Embodiment 1 describes a manufacturing method in which a mild steel sheet is wrapped in the stretched expanded PTFE film, a fluid dispersion of unburned PTFE particles is spray-coated to the stretched expanded PTFE film, and the stretched expanded PTFE film is heated at 100° C. for 2 hours, at 280° C. for 0.5 hours, and 350° C. for 2 hours.

In a method for forming a PTFE film layer described in the above reference documents Japanese Patent Application Laid-Open Publication No. 09-123302, No. 2005-329405 and No. 11-506987, the PTFE film layer is heated at a temperature equivalent to or higher than a melting point of the PTFE in order to bond the PTFE film layer (in the case in which an unburned PTFE film is used, the PTFE film is burned during the heating treatment as a result). However, such a heating treatment at a high temperature causes a micropore of a porous PTFE to be easily damaged, thereby possibly changing a pore size or closing the micropore by melting.

A size of a micropore of a PTFE film is changed depending on a rapid cooling operation or a slow cooling operation carried out after the heating treatment at a temperature equivalent to or higher than a melting point of the PTFE as well as a degree of stretching (stretching can be carried out before wrapping a support body, and stretching can also be carried out while wrapping a support body). A delicate adjustment is required to obtain a desired size of a micropore finally.

Due to the above reasons, in a conventional method, it is complicated and difficult to properly adjust properties such as a gas transmission rate of a PTFE film layer to be obtained. Consequently, it was impossible to implement a method for manufacturing a PTFE film layer having a specified gas transmission rate that is required for applications such as a gas transmission film of a fuel battery.

An object of the present invention is to provide a method for forming a porous PTFE layer. By the method, a porous PTFE layer can be easily formed without generating a wrinkle or a deformation on a surface, and properties such as a gas transmission rate thereof can be easily adjusted.

SUMMARY OF THE INVENTION

The inventors have found that one or at least two unburned PTFE films temporarily bonded to each other by sewing the films with an FEP fiber as needed are combined with a support body by a predetermined technique and heated at a temperature less than the melting point of the unburned PTFE, thereby enabling the PTFE films to be fused to each other with a wrinkle and a deformation suppressed, and have completed the present invention.

A method for forming a porous PTFE layer in accordance with the present invention is characterized by comprising the steps of:

(1) combining one or at least two unburned porous polytetrafluoro ethylene (PTFE) films and a support body that can withstand a heating condition in the following process (2) by a predetermined method; and (2) heating the matter resulted from the above process (1) under a predetermined condition.

The following typical 5 modes can be mentioned as the above process (1) for combining the PTFE films and the support body in accordance with the present invention.

The mode 1 is a process for combining one or at least two unburned porous PTFE films and a plate shaped support body by disposing the film on one face of the plate shaped support body and bending a peripheral section having a width of at least 1 cm in the PTFE film to the rear side of the support body in the case in which the support body is in a plate shape.

The mode 2 is a process for combining one or at least two unburned porous PTFE films and a plate shaped support body by disposing the film on one face of the plate shaped support body and partially press-bonding the PTFE film and the support body to each other in the case in which the support body is in a plate shape.

The mode 3 is a process for combining one or at least two unburned porous PTFE films on one face of a plate shaped support body by disposing the PTFE film and the plate shaped support body and sewing the PTFE film and the plate shaped support body to each other using a thermoplastic resin fiber or by bonding the PTFE film and the plate shaped support body to each other using a binder resin in the case in which the support body is in a plate shape.

The mode 4 is a process for winding one or at least two unburned porous PTFE films in a spiral shape around a rod shaped support body more than one time in the case in which the support body is in a rod shape.

The mode 5 is a process for combining one or at least two unburned porous PTFE films and a rod shaped support body by winding the PTFE film around the rod shaped support body and sewing the PTFE film and the rod shaped support body to each other using a thermoplastic resin fiber or by bonding the PTFE film and the rod shaped support body to each other using a binder resin in the case in which the support body is in a rod shape.

In the above modes 1, 2, and 4, it is preferable that the at least two of those unburned porous PTFE films are sewn to each other by using a thermoplastic resin fiber or the PTFE films are bonded to each other by using a binder resin in advance.

In the process (2), it is preferable to heat the matter resulted from the process (1) at a temperature of at least 150° C. and less than the melting point of the PTFE film for the range of 5 to 120 minutes. Moreover, in the case in which a thermoplastic resin fiber or a binder resin is used for the matter resulted from the process (1), it is more preferable to heat the matter resulted from the process (1) at a temperature in the range of the melting point of the used resin fiber or the used binder resin to 320° C. for the range of 10 to 60 minutes.

Moreover, the thermoplastic resin fiber or the binder resin is preferably to be a fiber made of NEOFLON™ EFEP (manufactured by DAIKIN INDUSTRIES, Ltd.), tetrafluoroethylene hexafluoropropylene copolymer (FEP), or tetrafluoroethylene perfluoro alkoxyethylene copolymer (PFA), or a binder resin containing FEP or PFA, and the heating treatment in the process (2) is preferably carried out at a temperature in the range of 200 to 320° C. for the range of 10 to 60 minutes in the case in which the fiber or the binder resin is used.

The preferable mode for the support body is, for instance, a plate shaped or rod shaped support body made of a mesh, a non woven fiber, a braided rope, or a woven fabric.

By the above method for forming a porous PTFE layer, there can be obtained the porous PTFE layer in which unburned porous PTFE films are fused and fixed to each other without a wrinkle and a deformation (with preferable properties such as a gas transmission rate in the predetermined range) and a molded product composed of a support body and such a porous PTFE layer formed on the surface of the support body.

By the present invention, a porous PTFE layer made of one or at least two PTFE films can be easily formed on a support body having any shape without a wrinkle and a deformation and without using a large-scale apparatus. Moreover, by temporarily bonding a plurality of PTFE films to each other using a simple technique in advance, the plurality of PTFE films can be disposed on (wound around) the support body at one time. In addition, the PTFE films and the support body can be fixed (fused) to each other by a heat treatment at a temperature lower than that adopted conventionally, thereby improving an efficiency of a manufacturing process.

Moreover, by the present invention, a laminated porous film can be easily manufactured using a plurality of PTFE films. Consequently, a gas transmission rate or the like can be easily adjusted by using a plurality of PTFE films. In the case in which a plurality of PTFE films is used, an influence can be restricted even if a slight irregularity occurs in a preparation process of the film (for instance, a pore size is partially enlarged or reduced extremely), and a performance can be satisfactorily persistent and perpetual. Therefore, by properly specifying a film thickness, a pore shape, a porosity, and the number of laminated films with a suitable combination, a gas transmission rate in the desired range can be implemented in a more stabilized manner. Furthermore, the properties that have not been achieved using only one PTFE film can be implemented. A porous PTFE layer and a molded product that have properties can then be effectively manufactured. The properties were not obtained in the past and are useful for many kinds of applications such as a gas-liquid separation.

DETAILED DESCRIPTION OF THE INVENTION

Figure 1:
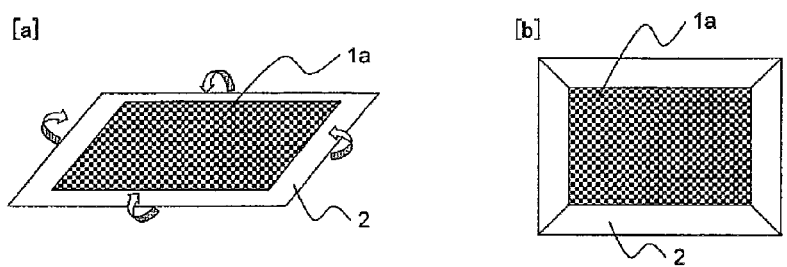
FIG. 1(a) depicts a configuration in which a PTFE film 2 is disposed on one face of a plate shaped support body 1a and a peripheral section of the PTFE film is bent to the rear side of the support body in the mode 1 of the process (1)
FIG. 1(b) shows a configuration after such a combination is carried out, wherein both drawings are viewed from the rear face.

In the following descriptions, an unburned porous PTFE film that is used for the present invention is simply called PTFE film in some cases.

A porous PTFE layer means a layer made of one or at least two unburned porous PTFE films. The PTFE films are fused to each other by being treated according to the predetermined process in accordance with the present invention. The state in which the PTFE films are fused in accordance with the present invention means that the PTFE films are fixed to each other by heating the unburned PTFE at a temperature lower than a melting point and that a detachment that is a problem in practice does not occur. The fused state is different from a state of so-called melting in an integrating manner by heating the unburned PTFE at a temperature equivalent to or higher than a melting point of the unburned PTFE.

Raw Material
Unburned Porous PTFE Film

An unburned porous PTFE film that is used for the present invention is not restricted in particular. The properties thereby such as a film thickness, a pore shape, and a porosity can be properly specified as needed. The unburned porous PTFE film can be stretched by one of stretching methods. In general, the unburned porous PTFE film has a film thickness in the range of 30 to 100 μm, a pore diameter in the range of 0.05 to 30 μm, and a porosity in the range of 20 to 95%. The unburned porous PTFE film having the predetermined properties can be adjusted by a publicly known method, and can also be obtained as a commercial product.

The number of PTFE films configuring a porous PTFE layer is not restricted in particular. In consideration of sufficient fusing, the porous PTFE layer is generally composed of one to ten PTFE films, preferably two or three PTFE films.

The combination of the properties and the number of the unburned porous PTFE films can be properly adjusted as needed in such a manner that the desired properties suitable for applications of a porous PTFE layer or a molded product thereof to be obtained finally, for instance a gas transmission rate in the predetermined range that is preferable as a gas and liquid separation film, can be achieved.

In the present invention, in the case in which at least 2 unburned porous PTFE films described above are laminated, it is preferable to temporarily bond the PTFE films since the PTFE films can be more firmly fused and a plurality of PTFE films can be disposed on a support body at one time.

Here, the temporary bonding means connecting the films in such a manner that the plurality of PTFE films is not easily separated. It is sufficient to temporarily bond a part of the PTFE film, for instance, one end in a longitudinal direction of a film in a tape shape or a peripheral part of a film in a sheet shape. It is not required to bond the entire surface of the film.

In the present invention, a means for temporary bonding is not restricted in particular. For instance, (a) a method for sewing films with a thermoplastic resin fiber, and (b) a method for coating a binder resin (dispersion, adhesive) are preferable. A resin to be used for temporary bonding is preferably a resin having a melting point lower than that of a PTFE film. For the methods, publicly known materials, apparatuses, techniques and so on can be used as needed.

In the present invention, as the thermoplastic resin fiber, there can be preferably mentioned, for instance, a fiber made of NEOFLON™ EFEP (ETFE series fluorocarbon resin, manufactured by DAIKIN INDUSTRIES, Ltd.), tetrafluoroethylene hexafluoropropylene copolymer (FEP), or tetrafluoroethylene perfluoro alkoxyethylene copolymer (PFA). Moreover, a binder resin containing FEP or PFA is preferably used as a binder resin. However, a fiber or a binder resin made of other resins can also be used.

As described later in detail, the present invention includes a mode in which not only a PTFE film but also a support body (non woven fabric, etc.) is temporarily bonded to a PTFE film. In this case, a slip in the process (2) can be suppressed in accordance with the present invention, and the PTFE film and the support body can be more firmly bonded to each other.

Support Body

A support body that is used for the present invention carries out a role in a prevention of a wrinkle and a deformation in the case in which the PTFE film is contracted and retracted in the heating process (2) of the forming method in accordance with the present invention, and imparts the predetermined physical properties and functions to a molded product composed of a support body and a porous PTFE layer. In detail, the support body has a pore or a void capable of transmitting a fluid and a solid, is made of any of a metal, an organic compound, and an inorganic compound, or a composite substance thereof, and is in any shape that can satisfy conditions for use. The modes such as a material and a shape of the support body can be properly specified as needed corresponding to applications for the molded product.

As a material of the support body, there can be mentioned, for instance, a metal such as a stainless steel (SUS), a ceramic, a mesh made of a polymer or the like (such as a PTFE fiber), a non woven fabric, a non woven fiber, a fiber bundle that are made of a glass fiber or the like, a braided rope, and a woven fabric. A network size of the above mesh and a thickness of the support body are not restricted in particular, and can be properly specified as needed in such a manner that a pressure loss of the PTFE film can be prevented.

The support body in accordance with the present invention is typically rod shaped or plate shaped. However, the shape is not restricted in particular, and various changes and modifications can be thus made without departing from the scope of the present invention. For instance, in the case in which a rod shaped support body is used, a gas can flow in an obtained tube-like molded product.

The above plate shaped support body is a support body of which a thickness is comparatively small as compared with the longitudinal and transverse length of a face on which a PTFE film is disposed. The thickness and firmness of the support body are not restricted in particular. The plate shaped support body in accordance with the present invention includes a support body made of a non woven fiber in a sheet shape.

On the other hand, the above rod shaped support body is a support body having a cross sectional shape of an (almost) circular form, an (almost) elliptical form, an (almost) polygonal form or the like and having a specific length in a longitudinal direction. Moreover, the rod shaped support body can be hollow (empty around the center of the cross section) or can be filled inside.

Among such support bodies, the plate shaped or rod shaped support body made of a mesh, a non woven fiber, a braided rope, or a woven fabric can be sufficiently fused to the PTFE film and can suppress a wrinkle and a deformation of the porous PTFE layer. In addition, a molded product that is industrially useful can be obtained by the support body. Consequently, the above support body is a preferable support body in accordance with the present invention.

For a method for forming a porous PTFE layer in accordance with the present invention, as described later, a heat treatment is carried out at a temperature equivalent to or higher than 150° C. generally. Consequently, a material of the support body is selected from ones that can withstand the heating condition (not molten and not deformed). In the case in which a non woven fabric is used as the support body, a binder may be molten or burnt by a heating treatment in some cases. Therefore, it is preferable to select a non woven fabric including no binders.

Moreover, a core material such as a copper wire having a surface to which silver plating has been carried out can also be used as a support body. The core material can be separated and removed after the process (2), and a hollow tube made of a porous PTFE layer can be manufactured. In the case in which a core material made of a material having a high extensibility (copper, annealed copper, silver, gold or the like) is used, the core material can be easily separated and removed from the porous PTFE layer by stretching the core material to be thinner.

Method for Forming a Laminated Porous Film

A method for forming a laminated porous film in accordance with the present invention includes at least processes (1) and (2) as described in the following. Other processes can also be combined to the method as needed.

Process (1)

In the method for forming a laminated PTFE porous film in accordance with the present invention, one or at least two unburned PTFE films and a support body are combined to each other by a predetermined method at first. This process is carried out in order to mainly suppress a slip of the PTFE film (causing a generation of a wrinkle) during the heating treatment in the process (2). As the process (1), the following 5 modes can be mentioned typically. Modes 1 to 3 are for the case in which the support body is in a plate shape, and modes 4 and 5 are for the case in which the support body is in a rod shape.

In a mode 1, one or at least two PTFE films are disposed on one face of a plate shaped support body, and a peripheral section of the PTFE film is bent to the rear side of the support body (see FIG. 1). By such a method, a slip in the process (2) can be suppressed by a friction between the PTFE film and the support body or the like. An area of the peripheral section of the PTFE film being bent to the rear side of the support body can be properly specified corresponding to the PTFE film and the support body to be used. In general, a peripheral section having a width of at least 1 cm in the PTFE film is preferably bent to the rear side of the support body.

Figure 2:
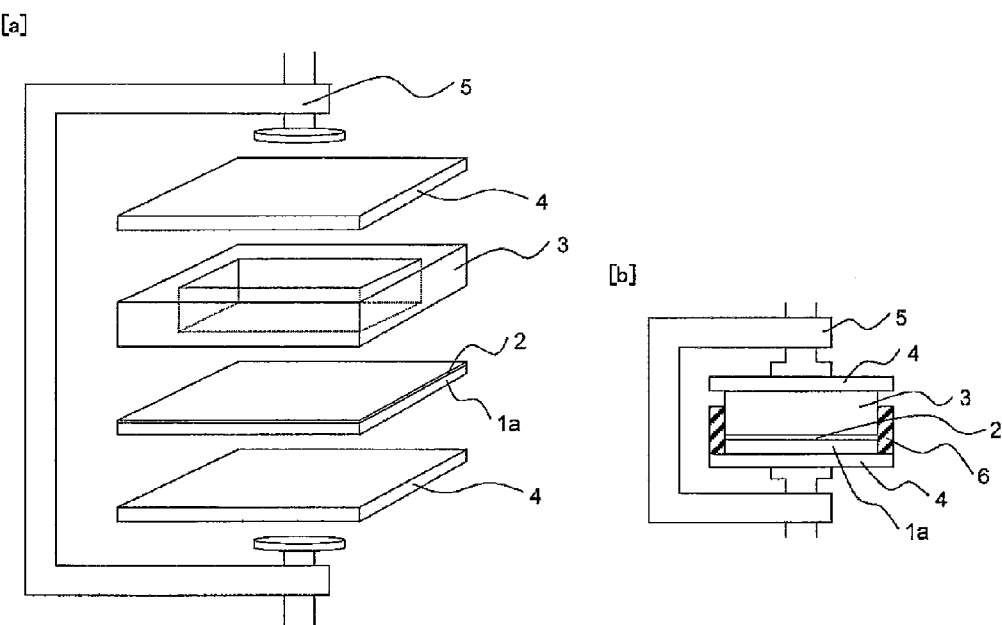
FIG. 2(a) shows a configuration in which a PTFE film 2 is disposed on one face of a plate shaped support body 1a and the peripheral sections of the PTFE film and the support body are partially press-bonded to each other by using a metal mold 3 in a die cutting shape, a metal plate 4, and a C-shaped clamp 5 in the mode 2 of the process (1); as depicted in FIG. 2(a), a guide 6 in a die cutting shape can also be further disposed on the periphery.

In a mode 2, after one or at least two PTFE films are disposed on one face of a plate shaped support body, the PTFE film and the support body are partially press-bonded to each other. The conditions such as a section to be press-bonded and a pressure can be properly specified corresponding to the PTFE film and the support body to be used in such a manner that a slip in the process (2) can be prevented. For instance, the following means can be adopted: (i) a PTFE film is disposed on one face of a plate shaped support body, (ii) a metal mold in a die cutting shape is disposed on the PTFE film, (iii) a guide can also be further disposed on the periphery in such a manner that the support body, the PTFE film, and the metal mold are not dislocated, (iv) a metal plate is disposed both on and under the integrated substance composed of the support body, the PTFE film, and the metal mold, and (v) the metal plates disposed in the above (iv) are tightened by a C-shaped clamp or the like (see FIG. 2). A pressure for tightening the C-shaped clamp or the like is in the range of 0.01 to 2.0 $kg/cm^2$ in general. For instance, in the case in which a fusing auxiliary for an FEP dispersion is carried out (combination with the following mode 3, described later in detail), the range of 0.5 to 2.0 $kg/cm^2$ is preferable. In the case in which the more 2 is adopted, a heating treatment in the process (2) is carried out while the PTFE film and the support body are partially press-bonded to each other by using an apparatus or an instrument, etc.

Figure 3:
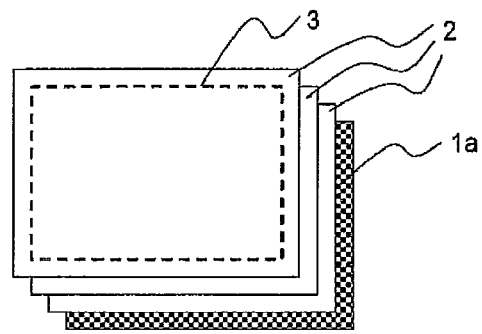
FIG. 3 shows a configuration in which a PTFE film 2 is disposed on one face of a plate shaped support body 1a and the PTFE film and the plate shaped support body are sewn to each other with a fiber made of FEP or the like (the PTFE film and the plate shaped support body are temporarily bonded) in the mode 3 of the process (1)

In a mode 3, after one or at least two PTFE films are disposed on one face of a plate shaped support body, the PTFE film and the plate shaped support body are sewn to each other with a fiber made of a thermoplastic resin (preferably, NEOFLON™ EFEP, FEP, PFA), or the PTFE film and the plate shaped support body are bonded to each other by a binder resin (preferably containing FEP or PFA) similarly to the means used for the temporary bonding described earlier (see FIG. 3). By such a step, not only a PTFE film but also a plate shaped support body can be fixed to a PTFE film. Consequently, a slip in the process (2) can be suppressed.

Figure 4:
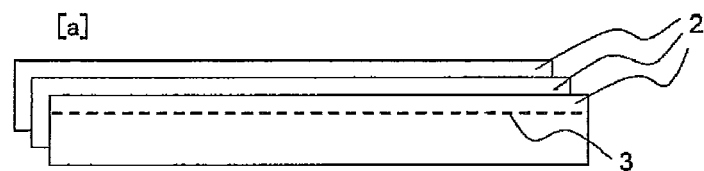
FIG. 4(a) shows a configuration in which three PTFE films 2 are temporarily bonded and FIG. 4(b) depicts the films wound in a spiral shape around a rod shaped support body more than one time in the mode 4 of the process (1)
Figure 4:
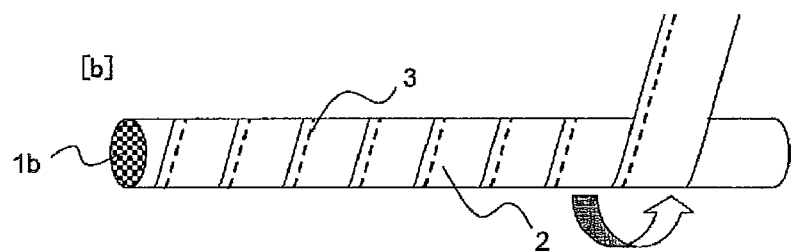

In a mode 4, one or at least two PTFE films are wound in a spiral shape around a rod shaped support body more than one time (see FIG. 4). In the case in which such winding is carried out, during a heating treatment in the process (2), the PTFE film is contracted and retracted in a direction of tightening the rod rather than contraction and retraction in a longitudinal direction of the rod, and the PTFE film is contracted and retracted according to a shape of the rod, thereby preventing a slip and a generation of a wrinkle. Consequently, it is not required to fix the PTFE film and the rod shaped support body to each other by sewing or the like. However, it is preferable to sew only the end face of the support body after the winding.

Figure 5:
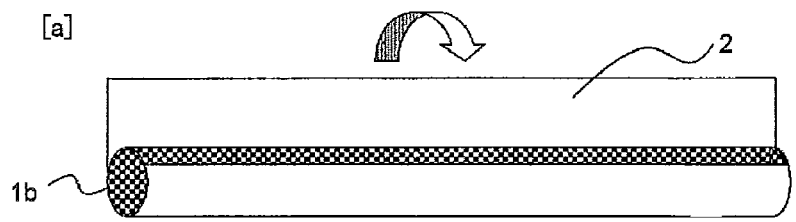
FIG. 5(a) depicts a configuration in which a PTFE film 2 is wound around a rod shaped support body 1b and FIG. 5(b) shows the PTFE film and the rod shaped support body are sewn to each other with a fiber made of FEP or the like (the PTFE film and the rod shaped support body are temporarily bonded) in the mode 5 of the process (1)
Figure 5:
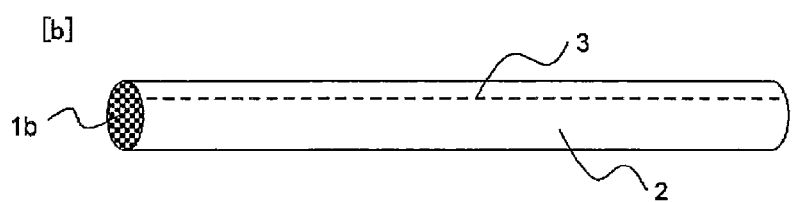

In a mode 5, after one or at least two PTFE films are wound around a rod shaped support body, the PTFE film and the rod shaped support body are sewn to each other with a fiber made of a thermoplastic resin (preferably, NEOFLON™ EFEP, FEP, PFA), or the PTFE film and the rod shaped support body are bonded to each other by a binder resin (preferably containing FEP or PFA) similarly to the means used for the temporary bonding described earlier or the mode 3 (see FIG. 5). In the case in which the PTFE film is wound in a spiral shape around a rod shaped support body as described above, such means for fixing the PTFE film and the rod shaped support body is not required. However, in the case in which the fixing means is used for the case of winding the PTFE film around a rod shaped support body like a vinegared rice rolled in dried layer as shown in FIG. 5, a slip in the process (2) can be prevented.

The above treatment in each mode (winding and others) can be carried out by a suitable means that is publicly known.

In the present invention, the combined use of means shown in the above modes 1, 2, and 3 is more preferable. For instance, in the case of the combined use of means shown in the above modes 1 and 2, after a peripheral section of the PTFE film is bent to the rear side of the plate shaped support body, the edge of the face of the support body on which the PTFE film is disposed is press-bonded, thereby more reliably preventing a slip and suppressing a generation of a wrinkle.

In the case in which at least two PTFE films are combined with the support body in the process (1) (for instance, the above modes 1, 2, and 4), the PTFE films can be temporarily bonded to each other as described earlier. However, there is no problem even in the case in which the PTFE films are not temporarily bonded to each other. In any case, a porous PTFE layer that is fused by a heating treatment in the following process (2) can be obtained. In the case in which PTFE films are wound in a spiral shape around a rod shaped support body, from a point of view of making margins for applying paste the same size in a laminated structure, it is preferable to dispose plural PTFE films on the support body at one time (not preferable to dispose one PTFE film more than one time).

Process (2)

Subsequently, the matter resulted from the above process (1) (the support body and one or at least two PTFE films that are combined by the predetermined method) is heated at a predetermined temperature. The heating treatment in the process (2) enables PTFE films to be fused and a pore of the PTFE film to be adjusted (heat setting).

The heating treatment in the process (2) is carried out at a temperature lower than a melting point of the PTFE film. Here, a melting point of the unburned porous PTFE is approximately 340° C. in general. However, the melting point may be slightly changed according to the properties of unburned porous PTFE to be used, and an actual melting point can be determined by using a differential scanning calorimeter (DSC).

An unburned porous PTFE film obtained by a stretching processing is contracted and retracted in the case in which the unburned porous PTFE film is heated at a temperature equivalent to or higher than that in the manufacture thereof, thereby possibly contributing to the fusing. However, in the case in which a heating temperature is low, the fusing between temporarily bonded films or the fusing between the PTFE film and the support body is made to be weak in some cases. Consequently, an attention must be paid to the bottom limit of a heating temperature, and a heating temperature must be properly adjusted.

In the case in which the temporary bonding of the films is carried out by using a fiber made of NEOFLON™ EFEP, FEP, or PFA, or a dispersion like the mode 3 or 5, the heating treatment at a temperature equivalent to or higher than a melting point of the resin is more preferable since the melting of the resin contributes to the fixing between PTFE films and the fixing between the PTFE film and the support body. The melting point of the above resin is approximately 260° C. for FEP, approximately 310° C. for PFA, and in the range of 155 to 200° C. for NEOFLON™ EFEP.

Accordingly, a heating temperature in the process (2) in accordance with the present invention is at least 150° C. and less than the melting point of the PTFE film in general. However, in the case of the temporary bonding or in the case in which a thermoplastic resin or a binder resin is used for the combination of the PTFE film and the support body, the heating temperature is preferably in the range of the melting point of the used resin fiber or the used binder resin to 320° C., more preferably in the range of 200 to 320° C.

A heating time in this process can be properly adjusted as needed. The heating time is generally in the range of 5 to 120 minutes, preferably in the range of 10 to 60 minutes. After the heating treatment, a heat is removed by a slow cooling operation or a rapid cooling operation using a publicly known conventional technique.

The principle of the fusing of PTFE films to each other by the above heating treatment is not cleared in detail. However, it is thought that a static electricity has relation to the fusing process. By the method in accordance with the present invention, the PTFE film is self-contracted and self-retracted without forming a wrinkle, and an inter-film air space being formed by a wrinkle is not generated, thereby creating a more tightly bonding state (natural press-bonding). Therefore, it is thought that it contributes to the above fusing.

Other Processes

The present invention can include other processes than the above processes (1) and (2) as needed.

For instance, a process for pressurizing the entire of the obtained porous PTFE layer can be carried out as needed after the above processes (1) and (2). Even only the fusing caused by the heating treatment enables the porous PTFE layer that is sufficiently fixed to be formed. However, the pressurization can prevent an air space between PTFE films from remaining and can further improve a fusing force. The pressurization in this case is carried out while a pressure is properly adjusted in such a manner that a pore of the porous PTFE layer is not damaged. In the case in which a fluid (gas or liquid) is used for the pressurization in particular, the porous PTFE layer can be suitably deformed and bonded to a support body along the shape of the support body without damaging a pore.

In general, a molded product obtained in accordance with the present invention is used under the pressurized conditions. Consequently, the molded product is used without separating a PTFE film from a support body. However, only the fused porous PTFE layer can be separated from a support body, and a process for the separation can also be included. The porous PTFE layer can be easily separated from the support body, for instance, by punching a section in which the temporary bonding by sewing films with FEP is not carried out (a temporarily bonded section is physically connected comparatively firmly by fused FEP).

In the case in which the temporary bonding by sewing films with FEP is not carried out, it is possible to separately carry out a means for preventing the porous PTFE layer from being separated from the support body due to a factor such as gravity. For instance, in the above pressurizing process, the porous PTFE layer and the support body can be bonded to each other by pressurization using a sealing material or an adhesive entirely or partially at a peripheral section or the like. Subsequently, the integrated porous PTFE layer and support body can be provided as a molded product.

Applications for a Laminated Porous Film and a Molded Product

By using the method for forming a porous PTFE layer in accordance with the present invention, a porous PTFE layer composed of one or at least two PTFE films can be formed on a plate shaped or rod shaped support body, and a molded product composed of such a support body and a porous PTFE layer can be obtained.

For instance, in the case in which a plate shaped stainless steel (SUS) mesh is used as a support body, a molded product in a sheet shape in which a porous PTFE layer is formed on the mesh can be obtained. On the other hand, in the case in which a rod shaped non woven fiber is used as a support body, a molded product in a tube shape in which the non woven fiber is incorporated in a porous PTFE layer can be obtained (a fiber incorporated type laminated PTFE porous tube can be obtained).

Moreover, a molded product in which a non woven fabric or a non woven fiber is fused to a porous PTFE layer can prevent a pressure loss (deformation of a micropore) of the PTFE film due to gas flow. In addition, the molded product is provided with a function for keeping a transmission gas amount per unit time to be constant for extended periods of time. Consequently, the molded product is extremely usable.

EMBODIMENTS

Embodiment 1

A biaxial stretched porous PTFE film (sample product manufactured by YMT, Ltd., a thickness of 30 μm, dimensions of 16 cm×16 cm) was disposed on one face (top side) of a SUS plate (a thickness of 1.5 mm). After the four sided peripheral sections of the PTFE film were bent to the rear side of the SUS plate, a heat treatment was carried out at 250° C. for one hour in an electric furnace while the top side faced upward. After the heat treatment, the porous PTFE layer was separated from the SUS plate, and was punched in a circular shape having a diameter of approximately 23 mm. The porous PTFE layer was then superposed on a SUS mesh plate separately processed to have the same dimensions (a thickness of 250 μm, including a non mesh section in a doughnut pattern on the periphery) to form a molded product. A wrinkle was not formed on the surface of the PTFE film after the above heat treatment.

Embodiment 2

In the method described in Embodiment 1, the number of biaxial stretched porous PTFE films was changed from 1 to 3, and other conditions were not changed. A molded product was then obtained. Similarly to Embodiment 1, a wrinkle was not formed on the surface of the PTFE film after the heat treatment.

Embodiment 3

In the method described in Embodiment 1, the number of biaxial stretched porous PTFE films was changed from 1 to 5, and other conditions were not changed. A molded product was then obtained. Similarly to Embodiment 1, a wrinkle was not formed on the surface of the PTFE film after the heat treatment.

Embodiment 4

Figure 6:
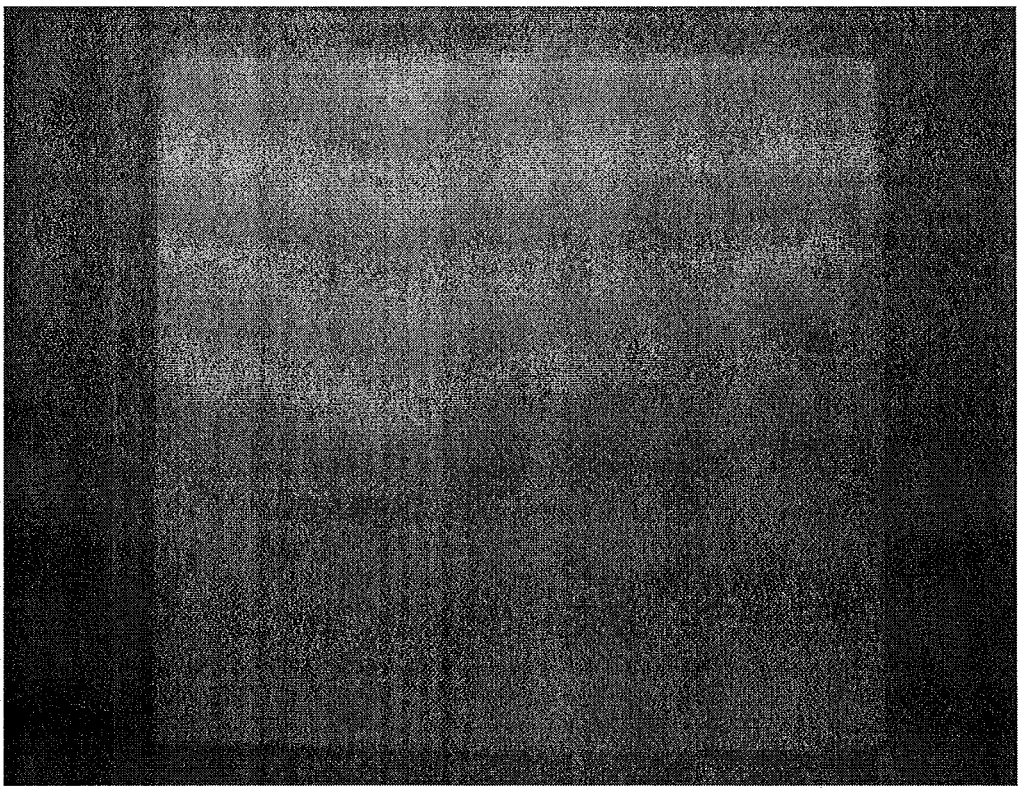
FIG. 6 is a photograph of a PTFE film that was obtained in Embodiment 4 and on which a wrinkle was not formed.

A biaxial stretched porous PTFE film was disposed on one face (top side) of a non woven fabric made of glass (a thickness of 300 μm, dimensions of 15 cm×15 cm). After the four sided peripheral sections of 1 cm of the PTFE film were bent to the rear side of the non woven fabric made of glass, a heat treatment was carried out at 150° C. for one hour in an electric furnace. After the heat treatment, the porous PTFE layer and the non woven fabric made of glass were punched together in a circular shape having a diameter of approximately 23 mm to form a molded product. A wrinkle was not formed on the surface of the PTFE film after the above heat treatment (see FIG. 6).

Embodiment 5

In the method described in Embodiment 4, the number of biaxial stretched porous PTFE films was changed from 1 to 3, and other conditions were not changed. A molded product was then obtained. Similarly to Embodiment 4, a wrinkle was not formed on the surface of the PTFE film after the heat treatment.

Comparative Example 1

Figure 7:
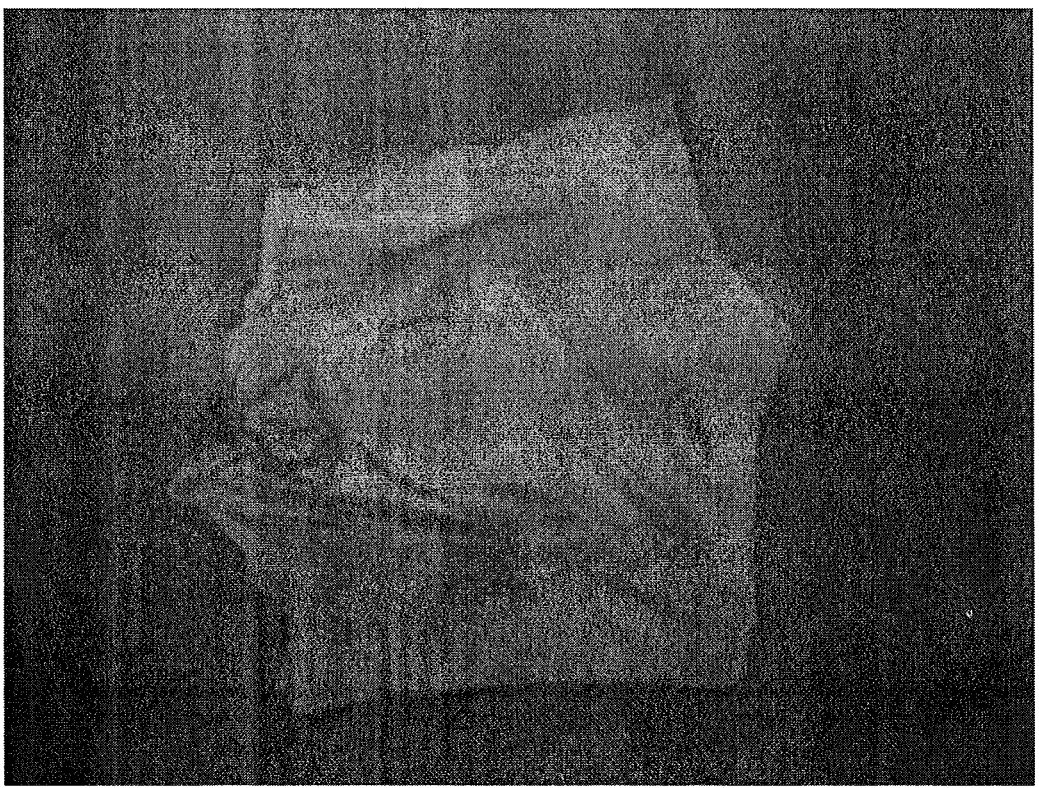
FIG. 7 is a photograph of a PTFE film that was obtained in Comparative Example 1 and on which a wrinkle was formed.

A biaxial stretched porous PTFE film was put over a SUS rod and hung from the both side of the SUS rod. The biaxial stretched porous PTFE film and the SUS rod were then disposed in an electric furnace in such a manner that they can be freely contracted and retracted in a heating treatment, and a heat treatment was carried out at 250° C. for one hour. After the heat treatment, the porous PTFE layer was punched in a circular shape having a diameter of approximately 23 mm, and was superposed on a SUS mesh plate separately punched to have the same dimensions to form a molded product. A wrinkle was formed on the surface of the PTFE film after the above heat treatment (see FIG. 7).

Comparative Example 2

In the method described in Comparative Example 1, the number of biaxial stretched porous PTFE films was changed from 1 to 3, and other conditions were not changed. A molded product was then obtained. The porous PTFE films obtained in Comparative Example 2 were not fused. Consequently, the porous PTFE films were punched and superposed on a SUS mesh plate to form a molded product. Similarly to Comparative Example 1, a wrinkle was formed on the surface of the PTFE film after the heat treatment.

Test Example 1

$CO_2$ Transmission Rate Measurement Test

A $CO_2$ transmission rate was measured using the molded products obtained in Embodiments 1 to 5 and Comparative Examples 1 and 2. The results are listed in Table 1.

TABLE 1

| | | | | $CO_2$ transmission rate measurement test results | | | |
|---|---|---|---|---|---|---|---|
| | | | | $CO_2$ transmission rate (ml/sec · cm$^2$) | | | |
| | Support body in a heat treatment | Support body of a molded product | Number of films | 2 kPa | 5 kPa | 10 kPa | 20 kPa |
| Embodiment 1 | SUS plate | SUS mesh plate | 1 | 0.012 | Not measured | Not measured | Not measured |

TABLE 1-continued

CO$_2$ transmission rate measurement test results

| | Support body in a heat treatment | Support body of a molded product | Number of films | CO$_2$ transmission rate (ml/sec · cm$^2$) | | | |
|---|---|---|---|---|---|---|---|
| | | | | 2 kPa | 5 kPa | 10 kPa | 20 kPa |
| Embodiment 2 | SUS plate | SUS mesh plate | 3 | 0.004 | 0.008 | Not measured | Not measured |
| Embodiment 3 | SUS plate | SUS mesh plate | 5 | 0.003 | 0.004 | 0.008 | 0.014 |
| Embodiment 4 | Glass non woven fabric | Glass non woven fabric | 1 | 0.011 | Not measured | Not measured | Not measured |
| Embodiment 5 | Glass non woven fabric | Glass non woven fabric | 3 | 0.004 | 0.007 | 0.013 | Not measured |
| Comparative Example 1 | Non | SUS mesh plate | 1 | 0.007 | 0.014 | Not measured | Not measured |
| Comparative Example 2 | Non | SUS mesh plate | 3 | 0.002 | 0.003 | 0.006 | 0.011 |

Test Example 2

Methanol Pressure Resistance Evaluation Test

The porous PTFE layer obtained in Embodiment 5 was individually punched in a circular shape having a diameter of approximately 23 mm, and was superposed on a SUS mesh plate separately punched to have the same dimensions to form a molded product. A pressure resistance limit was evaluated for methanol solutions having a variety of concentrations. The test was carried out at a room temperature, and a methanol solution was pressurized using a CO$_2$ gas. Under the constant pressurization condition using a CO$_2$ gas, a pressure at which methanol oozed to the back face of a film was measured as a pressure resistance limit. The results are listed in Table 2.

TABLE 2

Methanol pressure resistance evaluation test results

| | Concentration of a methanol solution (wt %) | | | |
|---|---|---|---|---|
| | 40 | 64 | 80 | 100 |
| Pressure resistance limit (kPa) | At least 100 | 80 | 50 | 20 |

What is claimed is:

1. A method for forming a porous PTFE layer, comprising the steps of:
   (1) winding one or at least two unburned porous PTFE films around a rod shaped support body that can withstand a heating condition in a following process (2) and combining the PTFE film and the rod shaped support body by sewing the PTFE film and the rod shaped support body to each other using a thermoplastic resin fiber; and
   carrying out the heating treatment in the process (2) at a temperature in a range of the melting point of the thermoplastic resin fiber up to 320° C. for a time of 10 to 60 minutes.

2. The method for forming a porous PTFE layer as defined in claim 1, wherein fiber is a fiber made of ethylene tetrafluoroethylene hexafluoropropylene copolymer (EFEP), tetrafluoroethylene hexafluoropropylene copolymer (FEP), or tetrafluoroethylene perfluoro alkoxyethylene copolymer (PFA), and the heating treatment in the process (2) is carried out at a temperature in the range of 200 to 320° C. for the time of 10 to 60 minutes.

3. The method for forming a porous PTFE layer as defined in claim 1, wherein the rod shaped support body is made of a mesh, a non woven fiber, a braided rope, or a woven fabric.

* * * * *